US006873141B1

United States Patent
Seyfang et al.

(10) Patent No.: US 6,873,141 B1
(45) Date of Patent: Mar. 29, 2005

(54) DEVICE FOR CONTROLLING A POWER OUTPUT STAGE

(75) Inventors: Bernd Seyfang, Ingersheim (DE); Harald Eisenhardt, Rutesheim (DE); Michael Prang, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/190,781

(22) Filed: Jul. 8, 2002

(30) Foreign Application Priority Data

Jul. 10, 2001 (DE) .......................................... 101 33 389

(51) Int. Cl.[7] .................................................. G06F 1/56
(52) U.S. Cl. ..................................... 323/286; 323/290
(58) Field of Search .............................. 363/17, 16, 80, 363/97, 98, 86, 89, 72; 323/284, 286, 288, 290, 222, 268, 272; 318/559, 439, 809, 811, 138; 219/388, 495

(56) References Cited

U.S. PATENT DOCUMENTS 4,959,606 A * 9/1990 Forge .......................... 323/286
5,197,375 A * 3/1993 Rosenbrock et al. .......... 99/328
6,342,822 B1 * 1/2002 So .............................. 332/109

FOREIGN PATENT DOCUMENTS

EP 0899860 9/2001

* cited by examiner

Primary Examiner—Rajnikant B. Patel
(74) Attorney, Agent, or Firm—Kenyon & Kenyon

(57) ABSTRACT

A control device for a power output stage is proposed, which includes a power output stage control which generates a triggering signal as a function of at least one control signal, for triggering at least one power output stage, which switches an electric load, preferably an inductive load having a recovery diode, a recording device being provided which records a measure for an electrical magnitude, which is applied to electric load. A feedback system is also provided, which supplies the power output stage control with at least one feedback signal as a function of the measure for the electrical magnitude, so as to influence the trigger signal.

11 Claims, 2 Drawing Sheets

DEVICE FOR CONTROLLING A POWER OUTPUT STAGE

FIELD OF THE INVENTION

The present invention is based on a device for controlling a power output stage.

BACKGROUND INFORMATION

A power output stage circuit having PWM (pulse-width modulation) operation and permanently closed operation is described in European Patent Application No. 899 860. A series-connected control circuit controls the pulse-width modulation generator and the power output stage into a permanently open state, a PWM operation having pulse-width modulated pulses and a permanently closed state, as a function of an externally predefined setpoint value, an actual value of the power output stage, and a reference voltage derived from the supply voltage. An increased power loss and a high EMV (electromagnetic compatibility) in the extreme range toward full load output may be avoided by the feature that it goes over prematurely from PWM operation to permanently closed operation as a function of a predefined setpoint value and of the supply voltage, and through a hysteresis of these values it returns again to PWM operation.

SUMMARY OF THE INVENTION

An object of the present invention is to provide a power output stage control which further increases the EMV compatibility and decreases the power loss.

The present invention relates to a device for controlling a power output stage which may generate a trigger signal for at least one power output stage, as a function of at least one control signal, in order to trigger the power output stage, in a switching operation, which may switch an electric load having an inductive component, which may have a recovery diode, for example. The device may further include a detection unit which may acquire a measure for the electrical magnitude applied to the load. It may be distinguished by having a feedback system provided, which may supply at least one feedback signal to the power output stage control, as a function of the measure for the electrical magnitude, for influencing the trigger signal. Because of this, both line-conducted and radiated interferences, particularly with pulse-width modulated power controllers for inductive loads in motor vehicles, may be further reduced, since the feedback may permit an optimized triggering of the power semiconductor. Interferences may be caused by high-frequency, steep-skirted switching on and off, in particular, by the time delays during transition from conducting operation to blocking operation, or vice versa, in a recovery diode connected in parallel to an electromotor. This time delay of the recovery diode at the transition from conducting operation to blocking operation, and vice versa, may be detected with the aid of a voltage dip or a voltage increase and may be used for a failure-optimized triggering of the power output stage. At the times of the transition from the conducting to the nonconducting state of the recovery diode, the steepness of curve of the drain voltage of the power output stage may be reduced in a controlled manner. This may be achieved by the feedback system, which may send a feedback signal on to the power output control, so that the response time of the power output stage may become slower during the transition time. At times when the switching action of the diode is finished, the power output stage may be triggered so as to reduce the overall power loss at maximal response time, i.e. at maximal steepness of curve.

In an example embodiment, a feedback activating device may be provided which controls the passing on of the feedback signal. The feedback activating device may pass on the feedback signal for the reduction of the steepness of curve only when the switching action of the diode is not yet terminated. Thereby interferences may be minimized. If, however, the switching action of the diode is finished, the feedback activating device may detect this with the aid of the decline of the voltage increase or the voltage dip, and may deactivate the passing on of the feedback signal. Thereby the switching behavior of the power output stage may be influenced in a controlled manner, in order, on the one hand, to minimize interferences during the switching action of the diode, and on the other hand to accelerate the switching behavior of the power output stage at the end of the switching action of the diode for the reduction of power loss.

In a further example embodiment, the feedback activating device may pass on the feedback signal when the measure for the electrical magnitude exceeds or falls below a boundary value. For example, the beginning of the switching action of the diode may become noticeable in the form of a voltage increase or a voltage decrease, which may be detected by boundary value comparison.

In a further example embodiment, it may be provided to store the electrical magnitude in a storage element, such as, for example, in an RC (resistance-capacitance) element, temporarily as a reference value. If the electrical magnitude exceeds or falls below the temporarily stored reference value, it may be concluded that there is a voltage peak, and the feedback is activated. The voltage peak may be used as feedback signal, if necessary, after signal adjustments via resistors. This analogous switching implementation may ensure an interference-minimized and loss-minimized triggering of the power output stage.

DETAILED DESCRIPTION

Figure 1:
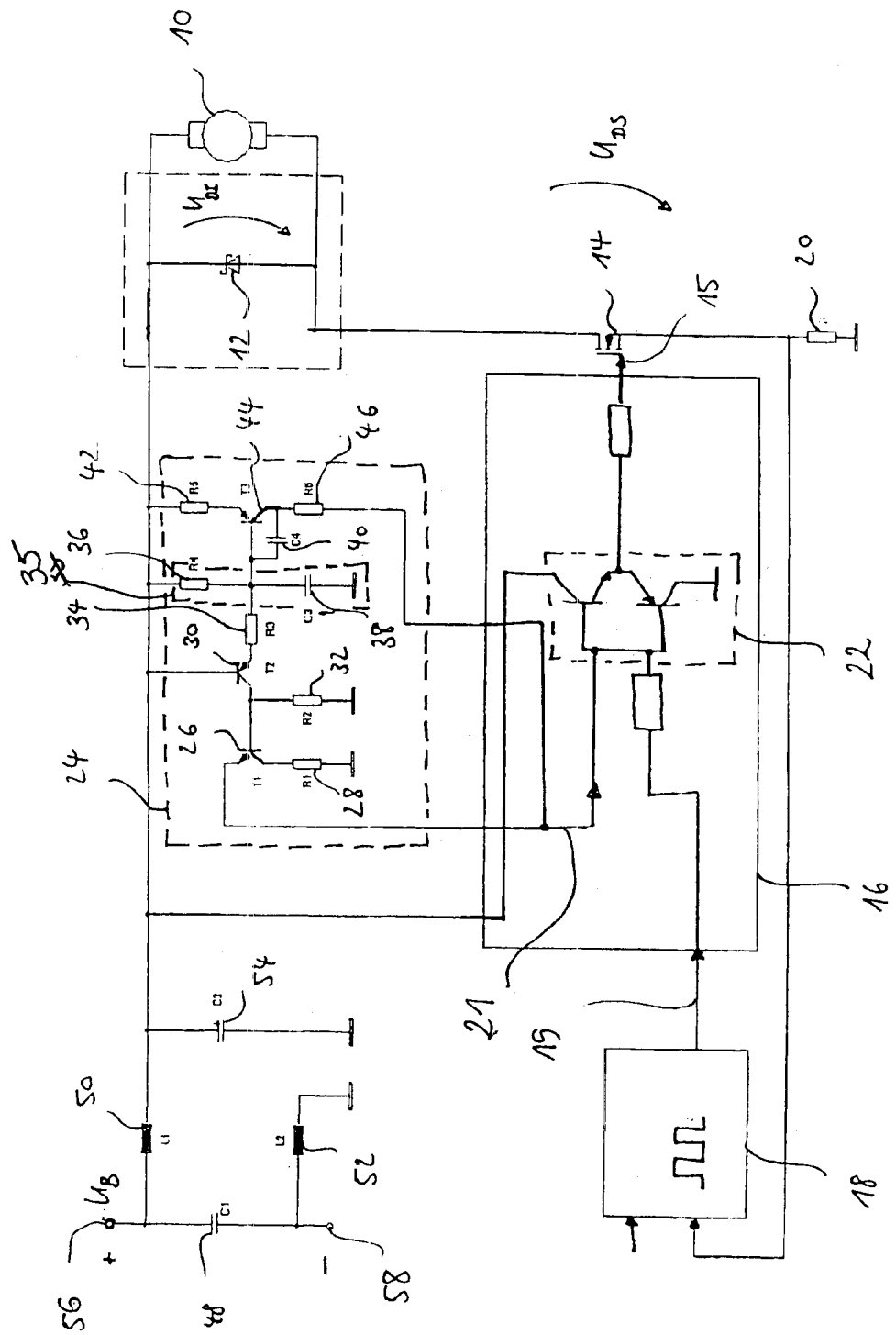
FIG. 1 shows a circuit configuration for controlling a power output stage.

An inductive load 10 is provided as the electrical load, such as an electromotor. A recovery diode 12 is connected in parallel to this inductive load 10. Inductive load 10 is connected via power output stage 14. For the detection of the current flowing through power output stage 14, a measuring resistor 20 connected to ground is provided, whose potential is picked off and supplied to a PWM control 18. A setpoint value is also supplied to this PWM control 18. From the setpoint value and the actual value, PWM control 18 generates a control signal which is used by a power output stage control 16 as an input variable. Power output control 16 includes a push-pull stage 22, made up of two transistors whose respective bases are connected to each other in an electrically conducting manner. Both control signal 19 via a series resistor and a feedback signal 21 are supplied to the base of push-pull stage 22 in an electrically conducting manner. Push-pull stage 22 is fed by positive supply voltage UB and connected to ground on the other end. The emitter of one transistor of push-pull stage 22 is connected via a series resistor to the gate terminal of power output stage 14 for passing on a trigger signal 15. The two transistors of push-pull stage 22 are interconnected as emitter follower.

Supply voltage UB, which may be picked off at positive pole 56, reaches the parallel connection of inductive load 10 and recovery diode 12 via a first choke 50. Between positive pole 56 and a negative pole 58 there is a first capacitor 48. The minus potential is taken by second choke 52 to ground. Also, a second capacitor 54 is provided which couples the positive supply potential of inductive load 10 to ground. First and second chokes 50, 52 and first and second capacitors 48, 54 are used for interference elimination.

A feedback system 24 is controlled by the positive supply voltage as input value. The positive supply potential is connected to the base of a second transistor 30, whose collector is connected via a second resistor 32, on one hand to ground, and on the other hand to the base of a first transistor 26. The collector of first transistor 26 is connected to ground via a first resistor 28, the emitter of first transistor 26 is brought together with the output signal of a sixth resistor 46 in an electrically conductive manner, and thereafter reaches the base of push-pull stage 22 as feedback signal 21. Feedback system 24 includes an RC element 35, which is formed from a fourth resistor 36 and a third capacitor 38, connected to ground, and is fed by the positive supply potential. The common potential of fourth resistor 36 and third capacitor 38 reaches the emitter of second transistor 30 via a third transistor 34, and on the other side the common potential is connected to the base of a third transistor 44 as well as via a fourth capacitor 40 to the collector of third transistor 44 in an electrically conducting manner. The positive supply potential of inductive load 10 also reaches the emitter of third transistor 44 via fifth resistor 42. The collector output of third transistor 44 is connected via sixth resistor 46 to the output potential of the emitter of first transistor 26, in an electrically conducting manner, thus creating feedback signal 21.

The functionality and operating mode of the circuit shown in FIG. 1 will now be described in greater detail with the aid of FIGS. 2a through 2c. The signal curves shown in FIGS. 2a and 2b show the drain voltage UDS, diode voltage UDI as well as the total voltage Uges resulting from these at switching on (FIG. 2a) and switching off (FIG. 2b) of power output stage 14. If one looks at the time-dependent voltage pattern of total voltage Uges, a voltage dip and a voltage peak may be determined. These voltage dips and voltage peaks are related to the switching behavior of recovery diode 12. At the appearance of the (change-over) switching actions, recovery diode 12 must first make free space of the barrier-layer capacitance in order to change its switching state. There is almost immediately a short-circuit if power output stage 14 is already turned on, but recovery diode 12 is not yet completely in blocking operation. The result is a voltage dip of total voltage Uges. This voltage dip has a negative effect on line-bound as well as radiated interferences. Now, according to the present invention, the detected voltage dip or voltage increase is used to influence the trigger signal for power output stage 14 in a controlled manner. This influence is clearly shown in FIG. 2c. During the change-over switching action of recovery diode 12, power output stage 14 is triggered with a lesser steepness, i.e. the switching action is deliberately slowed down. This slowing down of the switching behavior of power output stage 14 shows up in the second range 62 as well as in the framework of the fifth range 65 (when switching off power output stage 14). Once the change-over switching action of recovery diode 12 is ended, which may be recognized because of the ending of the voltage dip or the voltage increase of total voltage Uges, power output stage control 16 generates a trigger signal 15 in such a manner that the gate voltage UDS of power output stage 14 changes with maximum steepness (third range 63), until ground potential has almost been reached. The corresponding happens also for the switching-off phase of power output stage 14, as shown by fourth to sixth ranges 64 to 66.

Figure 2A:
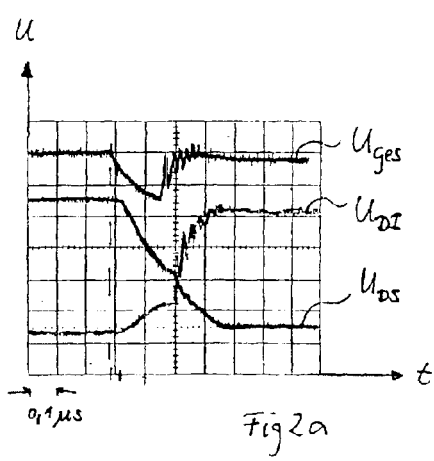
FIG. 2a shows a time-dependent voltage curves of the drain voltage of the output stage, of the diode voltage at the recovery diode, as well as the resulting total voltage at a closed process.
Figure 2B:
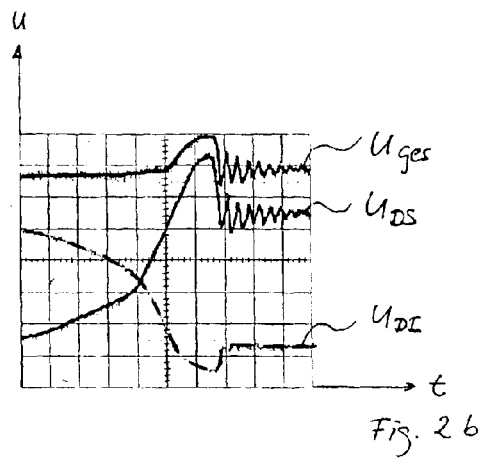
FIG. 2b shows the corresponding time-dependent voltage curves at open processes.
Figure 2C:
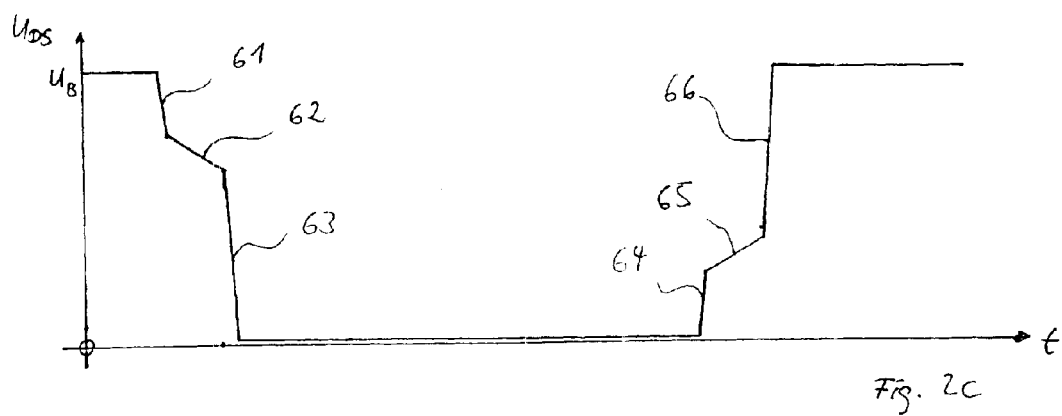
FIG. 2c shows the time-dependent curve of the drain voltage at feedback according to the present invention.

The signal curve shown in FIG. 2c may be achieved, for instance, by the circuit shown in FIG. 1. On account of feedback system 24, the voltage peaks (voltage dip in the switch-on phase, voltage increase in the switch-off phase) which are created by the time-delayed switching behavior of recovery diode 12, have, at the point in time of their creation, a negative feedback on power output stage control 16 in the form of negative feedback signal 21. Thereby the switching behavior of power output stage 14 is slowed down only during the times up to achieving complete blocking operation or conducting operation of recovery diode 12, on account of which the resulting EMV interferences are greatly reduced. Power output stage control 16 is configured so that, without feedback, the maximum switching speed of power output stage 14 is attained, which becomes noticeable from the very steep skirts of the first, third, fourth and sixth ranges 61, 63, 64, 66.

In RC element 35, which is made up of fourth resistor 36 and third capacitor 38, almost the normal level of total voltage Uges is stored, that is, when no voltage dip or voltage increase occurs. Now PWM control 18 creates a control signal 19 in such a manner that power output stage 14 is to be switched on. Power output stage control 16 creates a trigger signal 15 which generates a drain voltage UDS with maximum switching speed (first range 61). During this timespan the feedback is not yet active, and as yet no feedback signal 21 is being generated by the feedback system. For up to now, total voltage Uges did not yet exceed the reference voltage stored in RC element 35, so that none of the three transistors 26, 30, 44 turns on.

Subsequently, because of the change-over switching action of recovery diode 12, a voltage dip of total voltage Uges may come about during the switching on action of power output stage 14. If the voltage dip of total voltage Uges falls below the reference value stored in RC element 35 by a certain amount, the voltage relationships have the effect of biasing into conduction first and second transistor 26, 30. The voltage dip of total voltage Uges reaches the base of push-pull stage 22 as feedback signal 21, via first and second transistor 26, 30. Control signal 19, also supplied to the base of push-pull stage 22, is reduced by feedback signal 21 corresponding to the voltage dip (negative feedback). Thereby the switching speed of power output stage 14 may be reduced. The drain voltage UDS of power output stage 14 drops off at a lower slope in second range 62 than in first and third ranges 61, 63, in which no voltage dips of total voltage Uges were detected.

In the meantime, recovery diode 12 may be completely reversed. This is shown by the decline of the voltage dip. The total voltage Uges now approximately attains again the value stored temporarily in RC element 35. First and second transistor 26, 30 are no longer turned on, so that no feedback signal 21 reaches the base of push-pull stage 22. Power output stage control 16 now generates a trigger signal 15 with maximum switching speed, which may become noticeable in the form of the maximum steepness of curve in third range 63.

A control signal 19 from PWM control 18 now reaches power output stage control 16, which may effect switching off power output stage 14. In fourth range 64, power output stage 14 is first activated with maximum switching speed. Because of the change-over switching actions in recovery diode 12, a voltage increase of total voltage Uges develops, as in FIG. 2b. In RC element 35 the voltage level of total voltage Uges is before the voltage increase is stored. If the voltage peak exceeds the reference voltage stored in the RC element by a certain amount, third transistor 44 is turned on. Now the positive voltage peak reaches the base of push-pull stage 22 as feedback signal 21, via third transistor 44. Thereby a trigger signal 15 is generated in such a manner that the switching speed is reduced. This goes along with a less large voltage change of drain voltage UDS in the fifth range 65. If the change-over switching action of recovery diode 12 is ended, the voltage increase of total voltage Uges is reduced. If the voltage increase again falls below a certain boundary value, third transistor 44 is no longer turned on. Feedback signal 21 no longer reaches the base of push-pull stage 22. Power output stage 14 is once again activated with maximum switching speed (sixth range 66).

The two chokes 50, 52, as well as the two capacitors 48, 54 may be used to improve the EMV behavior. Besides that, the two chokes 50, 52 may ensure that there will indeed quickly be a detectable voltage dip or voltage increase in total voltage Uges. This voltage dip or this voltage increase may thereby be more easily detected, and after an appropriate signal adaptation via resistors 25, 32, 34, 42, 46, is also used correspondingly as feedback signal 21.

The circuit as in FIG. 1 described above may accordingly also be used if power output stage 14 is connected to the positive pole, and inductive load 10 together with recovery diode 12 are connected to the negative pole. The levels have to be adjusted accordingly.

This circuit may be applied for triggering an actuating drive in a motor vehicle, for example, for blower control or for flap adjustment. However, it is not limited to these.

What is claimed is:

1. A device for controlling a power output stage that performs a switching operation on an electric load that includes an inductive component, comprising:
    a storage element for storing a measure of an electrical magnitude applied to the electric load;
    a pulse-width modulator configured to generate at least one control signal, the at least one control signal being a pulse-width modulated signal;
    a power output stage control coupled to the pulse-width modulator and receiving the control signal, the power output stage control for generating a trigger signal for triggering the power output stage to perform the switching operation, the trigger signal being a function of the at least one control signal; and
    a feedback system for supplying at least one feedback signal to the power output stage control so as to influence the trigger signal, the at least one feedback signal being a function of the measure of the electrical magnitude.

2. The device according to claim 1, wherein the electric load includes a recovery diode.

3. The device according to claim 1, further comprising:
    a feedback activating device for controlling a passing on of a control signal.

4. The device according to claim 3, wherein the feedback activating device is configured to pass on the control signal when the measure of the electrical magnitude one of exceeds and falls below a boundary value.

5. The device according to claim 1 wherein the measure of the electrical magnitude is used as the feedback signal.

6. The device according to claim 1, wherein the storage element stores the measure of the electrical magnitude as a reference value for a detection of one of a dip and an increase in the electrical magnitude with reference to a reference value.

7. The device according to claim 6, wherein the storage element includes an RC element.

8. The device according to claim 1, wherein the power output stage control includes a push-pull stage.

9. The device according to claim 1, further comprising:
    a filtering arrangement for supplying energy to the electric load.

10. The device according to claim 1, wherein the feedback system is configured to be activated when one of an increase and a dip in the electrical magnitude is detected.

11. The device according to claim 1, wherein the power output stage control is configured to trigger the power output stage at a lesser switching speed when the feedback system is activated than when the feedback system is not activated.

* * * * *